T. J. FOX.
CUSHIONING DEVICE FOR LIQUID CONVEYING PIPES.
APPLICATION FILED MAR. 19, 1912.
1,056,529.
Patented Mar. 18, 1913.
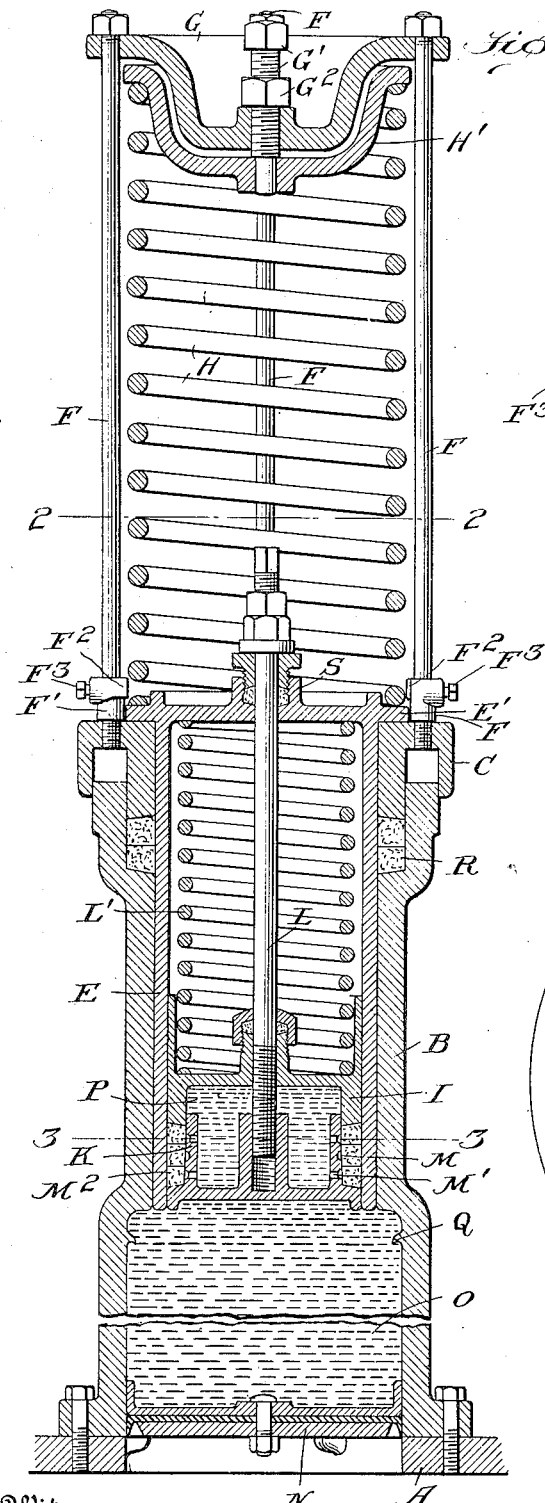
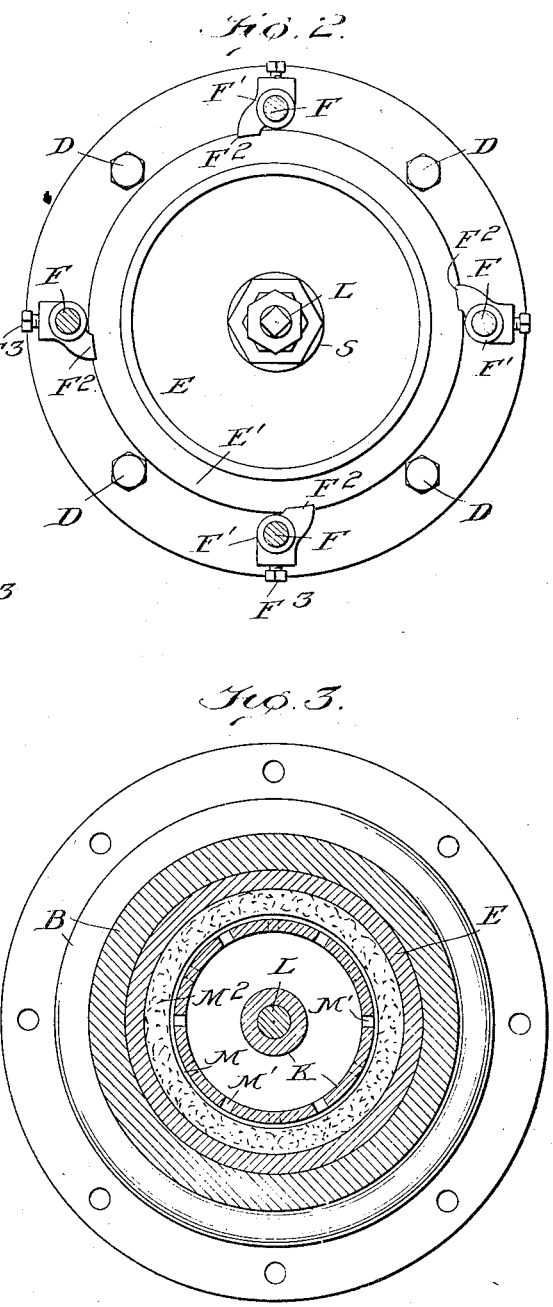
Witnesses
Edwin L. Bradford
Robert Craig Greene
Inventor
Thomas J. Fox
By Wallace Greene
Attorney

UNITED STATES PATENT OFFICE.

THOMAS J. FOX, OF MEMPHIS, TENNESSEE, ASSIGNOR TO J. A. BILLIONS, OF SHELBY, TENNESSEE.

CUSHIONING DEVICE FOR LIQUID-CONVEYING PIPES.

1,056,529.  Specification of Letters Patent.  Patented Mar. 18, 1913.

Application filed March 19, 1912. Serial No. 684,866.

*To all whom it may concern:*

Be it known that I, THOMAS J. FOX, a citizen of the United States, residing at Memphis, in the county of Shelby and State of Tennessee, have invented certain new and useful Improvements in Cushioning Devices for Liquid-Conveying Pipes, of which the following is a specification, reference being had therein to the accompanying drawing.

The invention relates to cushioning attachments for pipes in which sudden changes of liquid pressure occur from time to time, and the devices are particularly intended for use in connection with large pipes and where it is important that the apparatus should always be ready for operation although infrequently actuated.

In the accompanying drawings, Figure 1 is an axial section of the apparatus. Fig. 2 is a section on the line 2—2, Fig. 1. Fig. 3 is a section on the line 3—3, Fig. 1.

In these figures, A represents the end portion of a pipe, such for example as a water main, provided with an opening preferably not less in area than the cross sectional area of the interior of the pipe.

B represents a heavy cylinder bolted to the pipe and registering internally with the opening therein. It is provided at its upper end with an annular cap C which is pressed down upon wedge-like packing R by bolts D. Within the upper portion of this cylinder fits and slides an upwardly closed cylinder E having a marginal flange E' which normally rests upon the cap C. From the cap C rise rods F which carry at their upper ends a cup-like disk G provided with a central threaded adjusting bolt G' which may be fixed against rotation by a lock-nut $G^2$. Upon the flange E' rests a spring H the upper end of which abuts a cup or disk H' fitting over and held in alinement by the disk G and the lower non-threaded end of the bolt a shoulder of which presses upon the lower disk and governs its position and hence the compression or tension of the spring. Upon the rods F are sleeves F' provided with lateral projections $F^2$ which by sliding and rotating the sleeves may be thrown into and out of the path of the flange E' at any point above or below the same, to lock it against ascending or descending, for example, when adjustments or repairs are being made, the sleeves themselves being fixed to the rods by setscrews $F^3$.

Within the cylinder E works a plunger made up of oppositely turned telescoping cups I, K which are adjustable in respect to the space between the bottoms of the cups by means of a plunger rod L sliding in a packed bearing in the top of the cylinder F and having its lower end portion provided with right hand and left hand threads to engage the cups, respectively. The cylindrical wall of the lower cup is provided with external circumferential grooves M into which, respectively, passages M' lead from the interior of the cup, and around the grooved portion, between a marginal flange and the edge of the upper cup, are placed wedge-like packing rings $M^2$. The interior of the plunger being filled with oil, proper rotation of the plunger rod will tend to compress the packing and force it outward and will at the same time apply strong pressure to the oil and force it out through the packing. Between this plunger and the top of the cylinder E is compressed a spring coil L' materially lighter than the coil H above.

In the lower portion of the cylinder B and just above the pipe A is a free plunger head N having the usual flexible marginal flange which is pressed outward by the water below the plunger. The space between this plunger and the plunger I, K above is filled with heavy oil or flowing grease O which remains immovable so long as the normal water pressure below is just equal to the resistance of the springs above, but which moves upward whenever the water pressure is materially increased and downward again when that pressure falls. As the lower spring offers normally less resistance than the one above, the first effect of a water hammer blow is to compress this spring instantly and without overcoming inertia of any heavy parts, the grease being in this respect a part of the hammering liquid column. When the spring below no longer yields readily, the cylinder E rises, compressing the spring above. Thus the hammer blow meets resistance which rapidly increases from zero to a maximum, and meantime the water column advances while being arrested through a distance depending upon the length originally determined upon for the apparatus.

It is of moment that no water should escape past the moving devices; and the packings mentioned, the oil forced through the packing, and the grease all tend to prevent such action. For like reasons, I provide a flange Q in the lower portion of the cylinder B and above the path of the plunger head N. This flange being downwardly inclined, should water by any means follow up the side of the cylinder, it would hardly continue its course beyond this flange.

It is to be noted that the air trapped in the cylinder E may aid in cushioning, but in this large apparatus little reliance is placed upon such action, and in fact without the spring this portion of the apparatus would soon be inoperative because the air being always under pressure, would soon disappear.

In use, the rods F and the upper spring are usually above the surface of the ground so that the sleeves F' may readily be set to hold the lower portion of the device securely against the water pressure if the spring above be removed.

What I claim is:

1. The combination with a liquid conveying pipe, of a cylinder communicating with the pipe and having near the latter a free plunger head, an upwardly closed cylinder sliding in the upper part of the cylinder first mentioned, a plunger sliding in the lower part of the second cylinder, a spring coil offering yielding resistance to the upward sliding of said plunger, and means operable from a point beyond the cylinder first mentioned to vary the tension of the spring.

2. The combination with a water main, of a cylinder communicating with said main, a plunger head working in the lower portion of said cylinder, a hollow plunger provided with lateral oil apertures and located at some distance from said plunger head, to form a grease chamber between the two, and means for at will varying the internal capacity of the hollow plunger.

3. The combination with a water main, of a cylinder communicating with the main, a plunger head in the lower portion of the cylinder, an upwardly closed cylinder sliding in the upper part of the cylinder first mentioned, a spring resisting the upward movement of the second cylinder, a two-part oil-containing plunger working in the second cylinder and provided with circumferential packing and with apertures leading from within to said packing, a spring resisting the upward movement of said plunger, and means operable from above said cylinders to vary the tension of the last mentioned spring and to force oil through said apertures.

4. The combination with an open cylinder adapted to have one end fixed to and in communication with a liquid conveying pipe and provided at some distance from that end with an internal, downwardly turned, annular flange, of a plunger working in said cylinder near said end, a second cylinder fitting and sliding in the outer portion of the first, an oil filled, laterally perforated plunger working in the second cylinder, means for applying pressure to the oil in the plunger, a spring resisting the outward movement of the hollow plunger, and a second spring, of different resistance, opposing the outward movement of the second cylinder, the space between the two plungers being filled with greasy material flowing under pressure.

5. The combination with an open cylinder adapted to have one end fixed in communication with a liquid conveying pipe, of a plunger working in said cylinder near said end, a second downwardly open cylinder sliding in the first, a plunger working in the second cylinder, a spring carried by the second cylinder and resisting outward movement of the plunger therein, a spring acting against the outer end of the second cylinder, rods extending outward from the first cylinder alongside the spring last mentioned, and adjustable stops carried upon said rods and adapted to be swung into and out of the path of the outwardly moving second cylinder.

In testimony whereof I affix my signature in presence of two witnesses.

THOMAS J. FOX.

Witnesses:
  JNO. P. BULLINGTON,
  T. C. LOONEY.